(12) United States Patent
Wechs

(10) Patent No.: US 9,297,441 B2
(45) Date of Patent: Mar. 29, 2016

(54) MOTOR VEHICLE TRANSMISSION

(75) Inventor: Michael Wechs, Lindau (DE)

(73) Assignee: ZF Friedrichshafen AG, Friedrichshafen (DE)

(*) Notice: Subject to any disclaimer, the term of this patent is extended or adjusted under 35 U.S.C. 154(b) by 54 days.

(21) Appl. No.: 14/236,916

(22) PCT Filed: Jul. 30, 2012

(86) PCT No.: PCT/EP2012/064872
§ 371 (c)(1),
(2), (4) Date: Feb. 4, 2014

(87) PCT Pub. No.: WO2013/020850
PCT Pub. Date: Feb. 14, 2013

(65) Prior Publication Data
US 2014/0157924 A1    Jun. 12, 2014

(30) Foreign Application Priority Data
Aug. 8, 2011  (DE) .......................... 10 2011 080 560

(51) Int. Cl.
*F16H 3/08*  (2006.01)
*F16H 1/22*  (2006.01)
(Continued)

(52) U.S. Cl.
CPC .. *F16H 1/22* (2013.01); *B60K 6/48* (2013.01); *F16H 3/006* (2013.01);
(Continued)

(58) Field of Classification Search
CPC .................. F16H 3/0915; F16H 3/006; F16H 2003/0933; B60K 6/48; B60K 2006/4816
See application file for complete search history.

(56) References Cited

U.S. PATENT DOCUMENTS

| 8,485,055 B2 | 7/2013 | Gumpoltsberger et al. |
| 2006/0150759 A1* | 7/2006 | Gitt .......................... F16H 3/006 74/330 |

(Continued)

FOREIGN PATENT DOCUMENTS

| DE | 10 2006 054 281 A1 | 6/2008 |
| DE | 10 2007 040 449 A1 | 3/2009 |

(Continued)

OTHER PUBLICATIONS

Professor Dr. Ing P. Tenberge, Double Clutch Transmission—Power-Shiftable Winding Transmission, International Conference on Gears, Mar. 13-15, 2002, pp. 1033-1050, vol. 2, VDI-Berichte 1665.

(Continued)

*Primary Examiner* — William Kelleher
*Assistant Examiner* — Jake Cook
(74) *Attorney, Agent, or Firm* — Davis & Bujold, P.L.LC.; Michael J. Bujold

(57) ABSTRACT

A motor vehicle transmission having two partial transmissions with coaxial input shafts which can connect to an output shaft. The inputs of the first and second partial transmissions are a central shaft and a hollow shaft, respectively, that are coaxial with the output shaft. A countershaft assembly is parallel to the input and output shafts, to transmit rotation from the drive input to the output via a variety of gears. Gear stages (10-15) and shift elements (S1 to S7) selectively engage to change gears in the partial transmissions The hollow shaft couples stage (10) to a solid shaft of the countershaft assembly which has hollow shaft (9) that can couple the solid shaft via shifting element (S1) and can couple, via stage (11). Actuating shifting element (S2) to the central shaft of the first partial transmission which directly couples the output shaft via shifting element (S3).

14 Claims, 7 Drawing Sheets

(51) Int. Cl.
  *F16H 3/00*   (2006.01)
  *B60K 6/48*   (2007.10)
  *F16H 3/093*   (2006.01)

(52) U.S. Cl.
  CPC ............... *B60K 2006/4816* (2013.01); *F16H 2003/0933* (2013.01); *F16H 2200/0052* (2013.01); *F16H 2200/0086* (2013.01); *Y02T 10/6221* (2013.01); *Y02T 10/6256* (2013.01); *Y10T 74/19228* (2015.01)

(56) References Cited

U.S. PATENT DOCUMENTS

2009/0266199 A1* 10/2009 Jackson ................. F16H 3/006
  74/665 D
2010/0192717 A1    8/2010 Gitt
2011/0030488 A1*  2/2011 Gumpoltsberger ..... F16H 3/006
  74/331

FOREIGN PATENT DOCUMENTS

| DE | 10 2009 020 550 A1 | 11/2010 |
| WO | 2009/018969 A1 | 2/2009 |
| WO | 2010/127651 A1 | 11/2010 |

OTHER PUBLICATIONS

German Search Report Corresponding to 10 2011 080 560.5 mailed Jan. 8, 2014.
International Search Report Corresponding to PCT/EP2012/064872 mailed Oct. 19, 2012.
Written Opinion Corresponding to PCT/EP2012/064872 mailed Oct. 19, 2012.

* cited by examiner

| GEAR | K1 | K2 | S1 | S2 | S3 | S4 | S5 | S6 | S7 |
|---|---|---|---|---|---|---|---|---|---|
| 1.G. | X | | X | X | | | X | | |
| 2.G. | | X | | | | | X | | |
| 3.G. | X | | | X | | X | | | |
| 4.G. | | X | | | | | | X | |
| 5.G. | X | | | | X | | | | |
| 6.G. | | X | X | | | X | | | |
| 1.RG. | X | | X | X | | | | | X |
| 2.RG. | | X | | | | | | | X |

| GEAR | K1 | K2 | S1 | S2 | S3 | S4 | S5 | S6 | S7 |
|---|---|---|---|---|---|---|---|---|---|
| 1.G. | X |   | X | X |   |   | X |   |   |
| 2.G. |   | X |   |   |   |   | X |   |   |
| 3.G. | X |   |   | X |   | X |   |   |   |
| 4.G. |   | X | X |   |   |   | X |   |   |
| 5.G. | X |   |   |   | X |   |   |   |   |
| 6.G. |   | X |   |   |   |   | X |   |   |
| 1.RG. | X |   | X | X |   |   |   |   | X |
| 2.RG. |   | X |   |   |   |   |   |   | X |

Fig. 11

| GEAR | K1 | K2 | S1 | S2 | S3 | S4 | S5 | S6 | S7 |
|---|---|---|---|---|---|---|---|---|---|
| 1.G. | X |   | X | X |   |   |   | X |   |
| 2.G. |   | X |   |   |   |   |   | X |   |
| 3.G. | X |   |   | X |   | X |   |   |   |
| 4.G. |   | X |   |   |   |   | X |   |   |
| 5.G. | X |   |   |   | X |   |   |   |   |
| 6.G. |   | X | X |   |   | X |   |   |   |
| 1.RG. | X |   | X | X |   |   |   |   | X |
| 2.RG. |   | X |   |   |   |   |   |   | X |

Fig. 12

| GEAR | K1 | K2 | S1 | S2 | S3 | S4 | S5 | S6 | S7 |
|---|---|---|---|---|---|---|---|---|---|
| 1.G. | X | | X | X | | | | X | |
| 2.G. | | X | | | | | | X | |
| 3.G. | X | | | X | | X | | | |
| 4.G. | | X | X | | | X | | | |
| 5.G. | X | | | | X | | | | |
| 6.G. | | X | | | | | X | | |
| 1.RG. | X | | X | X | | | | | X |
| 2.RG. | | X | | | | | | | X |

Fig. 13

MOTOR VEHICLE TRANSMISSION

This application is a National Stage completion of PCT/EP2012/064,872 filed Jul. 30, 2012, which claims priority from German patent application serial no. 10 2011 080 560.5 filed Aug. 8, 2011.

FIELD OF THE INVENTION

The invention concerns a motor vehicle transmission comprising two partial transmissions that have input shafts arranged coaxially with one another, which can each be alternately connected into a force flow to a dive output by connecting the respective associated input shaft to a drive input, wherein the input shaft of the first partial transmission is in the form of a central transmission shaft and the input shaft of the second partial transmission is a hollow transmission shaft, wherein the drive output of the two partial transmissions is formed by an output shaft positioned coaxially with the input shafts, and parallel to the input shafts and the output shaft a countershaft assembly is provided, and wherein rotational movement transmitted from the drive input to the drive output can be transmitted in one of a number of discrete gear ratios, each of which can be obtained by directing the force flow via the countershaft assembly by means of at least two spur gear stages and by actuating at least one associated shifting element while shifting under load between the partial transmissions.

BACKGROUND OF THE INVENTION

Such motor vehicle transmissions are designed inter alia as so-termed dual clutch transmissions, in which the input shafts of the two partial transmissions can each be connected to a drive input by way of a respectively associated powershifting element, wherein the two powershifting elements are combined in a dual clutch. The gears that can be obtained in such a motor vehicle transmission are distributed alternately between the two partial transmissions in such manner that odd-numbered gears are produced by one of the partial transmissions and even-numbered gears by the other. Usually, the individual gears are defined by one or more spur gear stages each with discrete gear ratios, wherein the spur gear stages can be connected into the force flow by associated shifting elements so that a corresponding gear ratio is obtained between the drive input and the drive output of the motor vehicle transmission. Thanks to the alternate distribution of the gears between the two partial transmissions it is possible, while driving in a gear associated with one of the partial transmissions, already to preselect the next gear in the other partial transmission by appropriate actuation of the shifting elements, so that the ultimate change to the next gear is carried out by opening the powershifting element of one partial transmission and shortly afterward closing the powershifting element of the other partial transmission. In this way the gears of the motor vehicle transmission can be shifted under load, which improves the acceleration capability of the motor vehicle by virtue of a gearshift almost free from traction force interruption, and which enables more comfortable gearshift processes. Among others, dual clutch transmission are also designed with the drive input and drive output arranged coaxially with one another and with a countershaft assembly parallel to them both, so that the structure is compact in the radial direction. Furthermore, designs of dual clutch transmissions are known in which the individual gears of the transmission are obtained by directing the force flow via a plurality of spur gear stages, so that compared with conventional transmissions a correspondingly large number of gears can be obtained with relatively few spur gear stages.

From DE 10 2006 054 281 A1 a motor vehicle transmission of this type is known, which is designed as a dual clutch transmission and comprises two partial transmissions having input shafts arranged coaxially with one another. By connecting the respectively associated input shafts by means of a respective powershifting element the two partial transmissions can be connected alternately in a force flow form the drive input to a drive output, in this case the input shaft of the first partial transmission being in the form of a central transmission shaft and the input shaft of the second partial transmission being a hollow shaft. Coaxially with the two input shafts is provided an output shaft which forms the drive output of both partial transmissions, such that rotational movement of the drive input can be transmitted to the drive output with one of a number of discrete gear ratios, the force flow being directed via a countershaft assembly provided parallel to the input shafts and the output shaft. In this case at least two spur gear stages each with a discrete gear ratio are connected into the force flow by actuating associated shifting elements, so that by combining the actuation of the shifting elements and the corresponding guiding of the force flow via the associated spur gear stages, the several gear ratios can be obtained. In addition, however, the rotational movement of the central transmission shaft can be transmitted directly to the output shaft by actuating a shifting element arranged between them.

SUMMARY OF THE INVENTION

Starting from the prior art described above, the purpose of the present invention is now to make available a motor vehicle transmission by means of which a large number of powershifting gears can be obtained with the smallest possible number of spur gear stages and shifting elements.

According to the invention, a motor vehicle transmission comprises two partial transmissions having input shafts arranged coaxially with one another and which, by alternately connecting the respective associated input shaft to a drive unit, can each be connected into a force flow to a drive output. In this case the input shaft of the first partial transmission is in the form of a central transmission shaft and the input shaft of the second partial transmission is a hollow transmission shaft. A drive output of the motor vehicle transmission is formed by an output shaft positioned coaxially with the input shafts, and parallel to the input shafts and the output shaft a countershaft assembly is provided. Rotational movement transmitted from the drive input to the drive output can now be transmitted with one of several discrete gear ratios, each of which can be obtained with powershifting by directing the force flow via the countershaft assembly by way of at least two spur gear stages and by actuating at least one associated shifting element while shifting between the partial transmissions.

In the context of the invention the shifting elements are in this case preferably designed as synchronizers, with which an interlocked coupling of a loose wheel of a spur gear stage mounted to rotate on the transmission shaft concerned can be produced by means of an axially displaceable sliding sleeve that co-operates with a coupling element provided on the loose wheel and a synchronizing element provided on the transmission shaft, when, by means of one or more intermediate synchronizing rings and their frictional cones in collaboration with a friction cone on the coupling element, rotational speed differences between the loose wheel and the transmission shaft have been eliminated. Alternatively, however, in principle the shifting elements can also be designed as interlocking shifting elements, for example claw clutches, or even as frictional shifting elements such as disk clutches.

According to the invention, the input shafts of the two partial transmissions are connected to the drive input by means of associated powershifting elements, which are then preferably combined in a dual clutch. In that case the dual dutch is in particular designed as a wet-operating dual clutch, although if the torques to be transmitted are small it can also be a dry-operating dual clutch. However, other than with two powershifting elements the connection of the input shafts can also be formed by means of a single powershifting element that couples an input shaft to the drive input and an interlocking clutch between the input shafts, in which case on shifting from one to the other partial transmission a drive torque is provided by an electric machine which, during the shift and the connection of the other partial transmission, drives the other partial transmission and is connected to the other input shaft. Furthermore, by providing a planetary gear system it is also conceivable to produce a conjoint drive torque by an electric machine and the drive aggregate of the vehicle. Moreover, another dual shifting element can be provided in the area of the input shafts.

The invention embodies the technical principle that the hollow transmission shaft of the second partial transmission is connected, via a first spur gear stage, to a solid shaft of the countershaft assembly, on which in addition a coaxial hollow shaft is provided. By means of a first shifting element this hollow shaft can be coupled in a rotationally fixed manner to the solid shaft and can also be coupled to the central transmission shaft of the first partial transmission via a second spur gear stage by actuating a second shifting element. In turn, the central transmission shaft can be connected directly to the output shaft by means of a third shifting element. In addition, further spur gear stages are provided between on the one hand the output shaft and on the other hand the solid shaft or the hollow shaft.

By virtue of the design of a motor vehicle transmission according to the invention, a large number of power-shifted gears can be obtained with a small number of spur gear stages and shifting elements. This is because owing to the connection possibilities between the input shafts, the countershaft assembly and the output shaft, and the respectively associated guiding of the force flow by way of the countershaft assembly or even directly to the output shaft, a corresponding number of gears can be obtained with the existing spur gear stages and by a combination of the actuation of associated shifting elements. In this case the countershaft assembly is formed only by a hollow and a solid shaft, so that to produce the power-shifted gears the motor vehicle transmission according to the invention needs only a small number of shafts. Finally, thanks to the coaxial arrangement of the drive input and drive output, and since there is only one, parallel countershaft assembly, the structure is more compact in the radial direction.

In accordance with an advantageous embodiment of the invention the second and third shifting elements are combined in a first shifting packet arranged on the central transmission shaft. Furthermore, the hollow shaft of the countershaft assembly can also be coupled to the output shaft via a third spur gear stage by actuating a fourth shifting element. In addition the solid shaft of the countershaft assembly can be connected to the output shaft, in each case via a fourth spur gear stage by actuating a fifth shifting element, via a fifth spur gear stage by actuating a sixth shifting element and via a reversing stage by actuating a seventh shifting element. By combining the second and third shifting elements in a shifting packet, the two shifting elements can be actuated alternately by a common actuator, which correspondingly simplifies the design of a transmission control system of the motor vehicle transmission according to the invention. Moreover, by providing the further spur gear stages a corresponding number of gears can be obtained with only a few shifting elements. In the context of the invention a shifting packet is preferably designed as a double synchronizer.

As a further development of the above variant, the fourth and fifth shifting elements are combined in a second shifting packet and the sixth and seventh shifting elements in a third shifting packet. In this way the fourth and fifth shifting elements can also be actuated alternately by a common actuator and the sixth and seventh shifting elements can likewise be actuated alternately by a common actuator, which further simplifies the design of the transmission control system. In addition, in this way a total of six forward gears and two reversing gears can be obtained, and each of the forward and reversing gears can be engaged under load.

According to a further design of the invention, the fifth spur gear stage is positioned on the drive input side and the reversing stage on the output side of the third shifting packet. Alternatively, the fifth spur gear stage is provided on the drive output side and the reversing stage on the drive input side of the third shifting packet. In the context of the invention "drive input side" positioning relative to an element generally means arrangement on the side of the element facing toward the drive input, while "drive output side" positioning generally means arrangement on the side of the element facing toward the drive output. Thus, in the present case in relation to the third shifting packet the fifth spur gear stage is located either on the drive input side or on the drive output side, whereas conversely, the reversing stage is located on the drive output side or on the drive input side, respectively.

When a motor vehicle transmission is designed in accordance with the variants described above, a first forward gear is obtained by connecting the central transmission shaft of the first partial transmission to the drive input, and by actuating the first, second and sixth shifting elements, whereas in contrast a second forward gear can be obtained by coupling the hollow transmission shaft of the second partial transmission to the drive input and actuating the sixth shifting element. In addition, a third forward gear is engaged by connecting the central transmission shaft again to the drive input and actuating the second and fourth shifting elements. The next, fourth forward gear is obtained by coupling the hollow transmission shaft to the drive input and actuating the first and fourth shifting elements, while a fifth forward gear can be obtained by connecting the central transmission shaft to the drive input and actuating the third shifting element. Finally, rotational movement of the drive input is transmitted to the drive output with the gear ratio of a sixth forward gear by coupling the hollow transmission shaft to the drive input and actuating the fifth shifting element. In addition a first reversing gear is obtained by connecting the central transmission shaft of the first partial transmission to the drive input and actuating the first, second and seventh shifting elements, whereas a second reversing gear can be obtained by coupling the hollow transmission shaft to the drive input and actuating the seventh shifting element. Advantageously therefore, by virtue of the above-described actuations of the shifting elements and the alternate connection of the central transmission shaft and the hollow transmission shaft to the drive input, a total of six suitable power-shiftable forward gears and two power-shiftable reverse gears can be obtained.

According to a design of the invention alternative to the variants described earlier, the fourth and seventh shifting elements are combined in a second shifting packet and the fifth and sixth shifting elements in a third shifting packet.

Thus, in this case the third spur gear stage and the reversing stage are engaged by a common shifting packet and the fourth and fifth spur gear stages by another common shifting packet. This again allows a transmission control system of the motor vehicle transmission according to the invention to be designed simply, since for the shifting of all the spur gear stages a total of only four actuators are needed in order to couple the loose wheels of the respective spur gear stages to the shafts associated with them in each case. At the same time, six power-shiftable forward gears and two power-shiftable reversing gears can be obtained.

In a further development of the above design the fourth spur gear stage is positioned on the drive input side and the fifth spur gear stage on the drive output side of the third shifting packet. In an embodiment of the invention alternative to this, in contrast, the fourth spur gear stage is arranged on the drive output side and the fifth spur gear stage on the drive input side of the third shifting packet. In the context of the invention it is also possible to position the fourth spur gear stage either on the drive input side or on the drive output side relative to the third shifting packet, and then the fifth spur gear stage is positioned on a side of the third shifting packet facing toward the drive output or on a side thereof facing toward the drive input.

In the case of the above designs a first forward gear is obtained by connecting the central transmission shaft of the first partial transmission to the drive input and actuating the first, second and fifth shifting elements, whereas a second forward gear is obtained by coupling the hollow transmission shaft of the second partial transmission to the drive input and actuating the fifth shifting element. The next, third forward gear is then engaged by connecting the central transmission shaft to the drive input and actuating the second and fourth shifting elements and a further, fourth forward gear by coupling the hollow transmission shaft to the drive input and actuating the sixth shifting element. In addition a fifth forward gear is obtained by coupling the central transmission shaft to the drive input and actuating the third shifting element, whereas a sixth forward gear is obtained by connecting the hollow transmission shaft to the drive input and actuating the first and fourth shifting elements. Furthermore, a first reversing gear is engaged by connecting the central transmission shaft to the drive output and actuating the first, second and seventh shifting elements, whereas a second reversing gear is obtained by coupling the hollow transmission shaft to the drive input and actuating the seventh shifting element. By actuating the individual shifting elements as described above and by the alternate coupling of the two input shafts to the drive input, it is therefore possible to obtain a total of six power-shiftable forward gears and two power-shiftable reversing gears by means of the total of six spur gear stages and seven shifting elements.

Alternatively, a first forward gear can be obtained by connecting the central transmission shaft to the drive input and actuating the first, second and fifth shifting elements. A further, second forward gear is obtained by coupling the hollow transmission shaft to the drive input and actuating the fifth shifting element, whereas a third forward gear is engaged by connecting the central transmission shaft to the drive input and actuating the second and fourth shifting elements. Next a further, fourth gear is obtained by coupling the hollow transmission shaft to the drive input and actuating the first and fourth shifting elements, while a fifth forward gear can be engaged by connecting the central transmission shaft to the drive input and actuating the third shifting element. Finally, a sixth forward gear is obtained by coupling the hollow transmission shaft to the drive input and actuating the sixth shifting element. In addition a first reversing gear is obtained by connecting the central transmission shaft to the drive input and actuating the first, second and seventh shifting elements, whereas a second reversing gear is obtained by coupling the hollow transmission shaft to the drive input and actuating the seventh shifting element. Thus, in this case also a total of six power-shiftable forward gears and two power-shiftable reversing gears can be obtained from the total of six spur gear stages and seven shifting elements.

In a further, alternative actuation sequence of the shifting elements, a first forward gear is obtained by connecting the central transmission shaft of the first partial transmission to the drive input and actuating the first, second and sixth shifting elements, whereas a second forward gear can be obtained by coupling the hollow transmission shaft of the second partial transmission to the drive input and actuating the sixth shifting element. A further, third forward gear is engaged by connecting the central transmission shaft to the drive input and actuating the second and fourth shifting elements and the next, fourth forward gear by coupling the hollow transmission shaft to the drive input and actuating the fifth shifting element. Finally, a fifth forward gear is obtained by connecting the central transmission shaft to the drive input and actuating the third shifting element, while a sixth forward gear is obtained by coupling the hollow transmission shaft to the drive input and actuating the first and fourth shifting elements. In addition a first reversing gear is obtained by connecting the central transmission shaft to the drive input and actuating the first, second and seventh shifting elements, whereas a subsequent, second reversing gear can be obtained by coupling the hollow transmission shaft to the drive input and actuating the seventh shifting element. Consequently, by the above-described actuation sequence of the individual shifting elements and the alternate connection of the two input shafts to the drive input of the motor vehicle transmission as well, again six power-shiftable forward gears and two power-shiftable reversing gears can be obtained.

As a further alternative to what has been described above, a first forward gear is obtained by connecting the central transmission shaft to the drive input and actuating the first, second and sixth shifting elements. The next, second forward gear is obtained by coupling the hollow transmission shaft to the drive input and actuating the sixth shifting element, whereas a third forward gear can be engaged by connecting the central transmission shaft to the drive input and actuating the second and fourth shifting elements. In addition a fourth forward gear can be obtained by coupling the hollow transmission shaft to the drive input and actuating the first and fourth shifting elements, while a fifth forward gear is engaged by connecting the central transmission shaft to the drive input and actuating the third shifting element. Finally, a sixth forward gear is obtained by coupling the hollow transmission shaft to the drive input and actuating the fifth shifting element. A first reversing gear can be obtained by connecting the central transmission shaft to the drive input and actuating the first, second and seventh shifting elements, whereas a subsequent, second reversing gear is engaged by coupling the hollow transmission shaft to the drive input and actuating the seventh shifting element. Again, with the actuation sequence of the individual shifting elements described above and the alternate connection of the input shafts of the two partial transmissions, a total of six power-shiftable forward gears and two power-shiftable reversing gears can be obtained, as with the previous variants.

As a further development of the above-mentioned variants, the second and third shifting packets are in each case arranged on the output shaft. Alternatively, the second shifting packet is positioned on the output shaft, but the third shifting packet is arranged on the solid shaft of the countershaft assembly. In the first case mentioned, by positioning the two shifting packets on the output shaft the mass moment of inertia on the two input shafts can be reduced. In the second case mentioned, in which the third shifting packet is arranged on the solid shaft of the countershaft assembly whereas the second shifting packet remains on the output shaft, the shifting forces to be applied during a shifting process of the third shifting packet can be reduced since rotational speeds of the loose wheels associated with the third shifting packet are no longer made equal to the rotational speed of the output shaft during synchronization. Thus, the loading of the shifting elements of the third shifting packet can be reduced so that the shifting elements can if necessary be made smaller. However, this positioning depends on the discrete gear ratios of the spur gear stages associated with the third shifting packet, since with high gear ratios the rotation speed differences to be eliminated by the shifting elements are too large. The positioning of the third shifting packet on the countershaft assembly has the further advantage that when a vehicle is idling, loose wheels of the spur gear stages associated with the third shifting packet do not rotate and correspondingly do not contribute toward noise production.

In accordance with a further advantageous design of the invention, the first shifting element, by which the hollow shaft of the countershaft assembly can be coupled to the solid shaft of the countershaft assembly, is arranged on the drive input side of the hollow shaft. Alternatively, the first shifting element is positioned on the drive output side of the hollow shaft. The first of these variants has the advantage that, in the axial direction, the first shifting element is located next to the other shifting elements and thus also to the shifting packets, so that sufficient space is available for the individual shifting elements in the radial direction and for the respectively associated actuators.

According to the invention, in addition a gearwheel of the second or third spur gear stage meshes with a gearwheel of a shaft whose extension is connected to an electric machine. This enables the motor vehicle transmission according to the invention to be hybridized, in that by way of the gearwheel and shaft the electric machine can be driven and can so generate electrical energy, or alternatively the electric machine can act upon the shaft and hence the spur gear stage concerned to assist a drive movement or for purely electric driving. In this case the coupling of the electric machine by way of the shaft and the gearwheel to the second or third spur gear stage has the particular advantage that at the second or third spur gear stages, owing to the positioning of the shifting elements according to the invention, a connection to the drive input and a connection to the drive output can be separated. Thus, if the connection to the drive input is interrupted the vehicle can be driven purely electrically, without bringing about the drag losses of a dual clutch provided on the drive input side. This possibility of drive input side decoupling enables an electrical accumulator to be charged while the vehicle is at rest, since the electric machine is connected to the drive aggregate of the motor vehicle transmission by way of the spur gear stage, while no rotational movement is transmitted to the drive output. Preferably, in this case the gearwheel meshes with a gearwheel of the second or third spur gear stage provided on the countershaft assembly. Apart from that, however, it is also conceivable in the context of the invention to arrange at least one electric machine in the area of any of the shafts of the transmission, on any of the fixed wheels of the spur gear stages, on any of the loose wheels of the spur gear stages or on any additional fixed wheel. Then, depending on the respective positions, the electric machine either recuperates electrical energy, or assists rotational movement, or enables purely electric driving, i.e. operation of the motor vehicle transmission by means of the at least one electric machine.

The invention is not limited to the indicated combination of the characteristics recited in the claims. It is also possible to combine individual characteristics with one another, insofar as they emerge from the description of embodiments given below or directly from the drawings. The reference of the claims to the drawings by the use of indexes is not intended to restrict the protective scope of the claims.

BRIEF DESCRIPTION OF THE DRAWINGS

Further advantageous design features of the invention emerge from the following description of preferred embodiments of the invention, which refers to the figures represented in the drawings, which show:

FIG. 11: A further example shifting scheme of a motor vehicle transmission according to the invention, according to FIGS. 6 to 9;

FIG. 12: A further example shifting scheme of a motor vehicle transmission according to FIGS. 6 to 9; and FIG. 13: A further example shifting scheme of a motor vehicle transmission according to the invention, according to FIGS. 6 to 9.

DETAILED DESCRIPTION OF THE PREFERRED EMBODIMENTS

Figure 1:
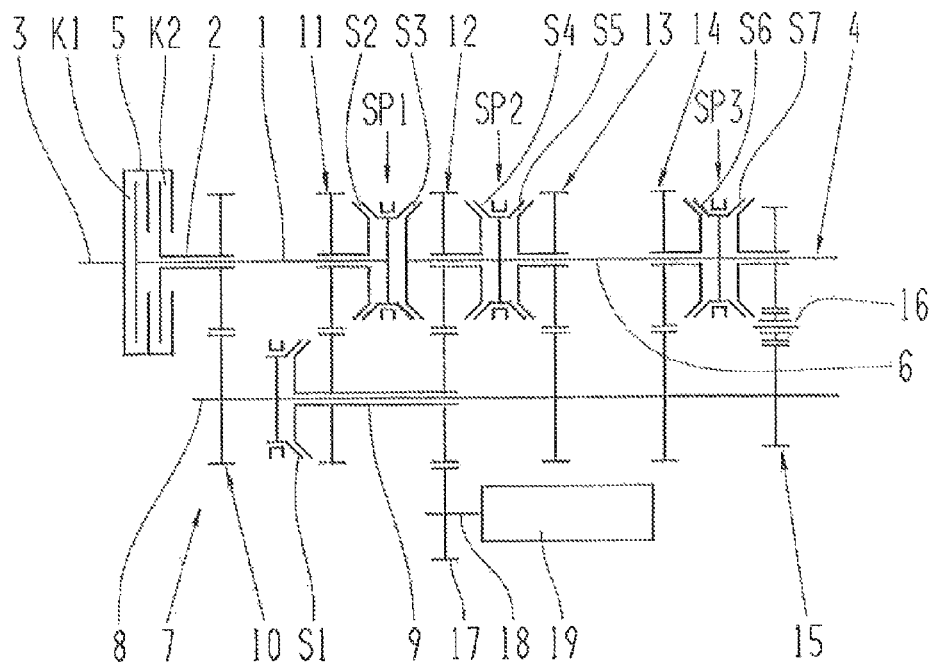
FIG. 1: A schematic representation of a motor vehicle transmission according to a first preferred embodiment of the invention.

FIG. 1 shows a schematic view of a motor vehicle transmission according to the invention, in a first preferred embodiment thereof, which is preferably a transmission for a commercial vehicle. This motor vehicle transmission comprises two partial transmissions, each respectively associated with an input shaft. In this case an input shaft of the first partial transmission is in the form of a central transmission shaft 1, with the input shaft of the second partial transmission positioned coaxially with it in the form of a hollow transmission shaft 2. The two partial transmissions can now be connected into a force flow from a drive input 3 of the motor vehicle transmission, which is connected to a drive aggregate of the motor vehicle, to a drive output 4, in that either the central transmission shaft 1 of the first partial transmission is connected to the drive input 3 by way of an associated power-shifting element K1 or the hollow transmission shaft of the second partial transmission is connected thereto by way of an associated power-shifting element K2. In this case the two power-shifting elements K1 and K2 are combined in a dual clutch, which is preferably a wet-operating dual clutch. The drive output 4 is formed by an output shaft 6, which extends coaxially with the central transmission shaft 1 and the hollow transmission shaft 2. Furthermore, parallel to the central transmission shaft 1, the hollow transmission shaft 2 and the output shaft 6 a countershaft assembly 7 is provided, which consists of a solid shaft 8 and a hollow shaft 9, with the hollow shaft 9 extending coaxially with the solid shaft 8.

Rotational movement of the drive input 3 can now be transmitted by way of one of the two partial transmissions to the output shaft 6 and hence to the drive output 4, in that starting from the central transmission shaft 1 or the hollow transmission shaft 2 the force flow is directed via the countershaft assembly 7 to the output shaft 6. For this purpose the hollow transmission shaft 2 is permanently connected via a first spur gear stage 10 to the solid shaft 8 of the countershaft assembly 7, which by means of a first shifting element S1 can be connected in a rotationally fixed manner to the hollow shaft 9. In this case the shifting element S1 is designed as a synchronizer, whose sliding sleeve—here not shown in any more detail—can be displaced selectively by an actuator—also not shown—from a neutral position to the position in which the solid shaft 8 is coupled with interlock to the hollow shaft 9, such that as known to those familiar with the subject, this synchronization eliminates rotational speed differences between the solid shaft 8 and the hollow shaft 9.

In turn, the hollow shaft 9 carries a fixed wheel of a second spur gear stage 11, whose loose wheel is mounted to rotate on the central transmission shaft 1 and can be connected rotationally fixed to the central transmission shaft 1 by means of a second shifting element S2, so that rotational movement of the central transmission shaft 1 is transmitted to the hollow shaft 9 with a discrete gear ratio of the second spur gear stage 11. Axially adjacent to the second shifting element S2 there is provided, in addition, a third shifting element S3 which, when actuated, couples the central transmission shaft 1 in a rotationally fixed manner to the output shaft 6 so that rotational movement of the central transmission shaft 1 is transmitted directly to the output shaft 6 and hence to the drive output 4 of the motor vehicle transmission.

As can also be seen from FIG. 1, the second shifting element S2 and the third shifting element S3 are combined in a first shifting packet SP1, and accordingly they have a common shifting element. In the present case the shifting elements S2 and S3 are also designed as synchronizers, so that the first shifting packet SP1 is formed in the manner of a dual synchronizer in which a sliding sleeve positioned between the shifting elements S2 and S3 can be pushed by an associated actuator from a central position either to a position which actuates the second shifting element S2, in which the loose wheel of the second spur gear stage 11 is fixed to the central transmission shaft 1, or to an actuating position of the third shifting element S3, in which the central transmission shaft 1 is solidly coupled to the output shaft 6.

Furthermore, the hollow shaft 9 carries a fixed wheel of a third spur gear stage 12 which meshes with a loose wheel mounted to rotate on the output shaft 6. The loose wheel of the third spur gear stage 12 can be connected rotationally fixed to the output shaft 6 by means of a fourth shifting element S4, and in that case rotational movement of the hollow shaft 9 of the countershaft assembly 7 is coupled to rotational movement of the output shaft 6 in accordance with a discrete gear ratio of the third spur gear stage 12. Axially adjacent to the fourth shifting element S4 is arranged a fifth shifting element S5, which in an actuating position fixes a loose wheel of a fourth spur gear stage 13 to the output shaft 6. This loose wheel of the fourth spur gear stage 13 meshes permanently with a fixed wheel of the fourth spur gear stage 13, which is positioned rotationally fixed on the solid shaft 8 of the countershaft assembly 7. Consequently, when the loose wheel of the fourth spur gear stage 13 is coupled to the output shaft 6, rotational movement of the solid shaft 8 of the countershaft assembly 7 is transmitted to the output shaft 6 with a discrete gear ratio of the fourth spur gear stage 13.

As can in this case be seen from FIG. 1, the fourth shifting element S4 and the fifth shifting element S5 are combined in a second shifting packet SP2, which is in this case designed as a dual synchronizer analogously to the first shifting packet SP1 and is arranged on the output shaft 6. Accordingly a sliding sleeve common to the fourth shifting element S4 and the fifth shifting element S5 can be moved from a neutral position either to a position where, by means of a respectively associated actuator, it actuates the fourth shifting element S4 or to one in which it actuates the fifth shifting element 35.

Farther along, the solid shaft 8 of the countershaft assembly 7 carries a fixed wheel of a fifth spur gear stage 14 which meshes with a loose wheel mounted to rotate on the output shaft 6. This loose wheel of the fifth spur gear stage 14 can again be coupled in a rotationally fixed manner to the output shaft 6 by means of a sixth shifting element 36, so that rotational movement of the solid shaft 8 is coupled with a discrete gear ratio to rotational movement of the output shaft 6. Axially adjacent to the sixth shifting element 36 there is in addition a further, seventh shifting element S7 which, when actuated, connects a loose wheel of a reversing gear 15 to the output shaft 6. This loose wheel of the reversing gear 15 is connected by way of an intermediate gearwheel mounted to rotate on an intermediate shaft 16 to a fixed wheel arranged in a rotationally fixed manner on the solid shaft 8. When the loose wheel of the reverse gear 15 is coupled to the output shaft 6 by means of the seventh shifting element 37, rotational movement of the solid shaft 8 is accordingly transmitted to the output shaft 6 with a discrete overall gear ratio consisting of the individual ratios of the fixed wheel and the intermediate wheel and the intermediate wheel and the loose wheel of the reverse gear. Thus the solid shaft 8 and the output shaft 6 rotate in the same direction, so that ultimately the output shaft 6 rotates in the opposite direction to the central transmission shaft 1 and the hollow transmission shaft 2, so that the motor vehicle concerned can drive in reverse.

As can also be seen from FIG. 1, the sixth shifting element 36 and the seventh shifting element S7 are combined in a third shifting packet SP3 and are each designed as synchronizers, so that analogously to the two shifting packets SP1 and SP2, the third shifting packet SP3 is also made as a dual synchronizer. A shifting element in the form of a shifting sleeve of this third shifting packet SP3 can be moved selectively by an associated actuator from a neutral position, either to an actuating position of the sixth shifting element S6 or to an actuating position of the seventh shifting element S7, whereby the respective loose wheel of the fifth spur gear stage 14 or of the reversing gear 15 is then connected rotationally fixed to the output shaft 6.

As a further special feature, a gearwheel 17 arranged in a rotationally fixed manner on a shaft 18 meshes with the fixed wheel of the third spur gear stage 12 arranged on the hollow shaft 9, this shaft 18 being connected to an electric machine 19. Accordingly, by virtue of the meshing of the fixed wheel of the third spur gear stage 12 with the gearwheel 17 rotational movement of the hollow shaft 9 is coupled with a discrete gear ratio defined thereby, to rotational movement of the shaft 18. The electric machine 19 can function either as a generator so that, when driven by the shaft 18, it feeds electrical energy into an electric accumulator—not illustrated here—or it can be operated as an electric motor which, when energized with current, acts to drive the shaft 18. Thus, the electric machine can either be driven by the hollow shaft 9, or it can drive the hollow shaft 9 and can thereby either assist rotational movement of the hollow shaft 9 or initiate such a movement.

The connection of the electric machine 19 via the gearwheel 17 to the third spur gear stage 12 has the advantage that the electric machine 19 can be decoupled on the one hand by means of the first shifting element S1 from the dual clutch 5, and on the other hand by means of the fourth shifting element S4 from the drive output 4. The latter case makes it possible to operate the electric machine 19 without transmitting rotational movement to the drive output 4, so that even when the vehicle is at rest the electric machine can be operated in order to charge an electric accumulator. On the other hand, however, the vehicle can be driven purely electrically by the electric machine 19 since it can be decoupled by means of the first shifting element 13 from the dual clutch 5 and hence also from the drive input 3, so that thanks to the decoupling from the dual clutch 5 drag losses in the clutch 5 are prevented.

Figure 2:
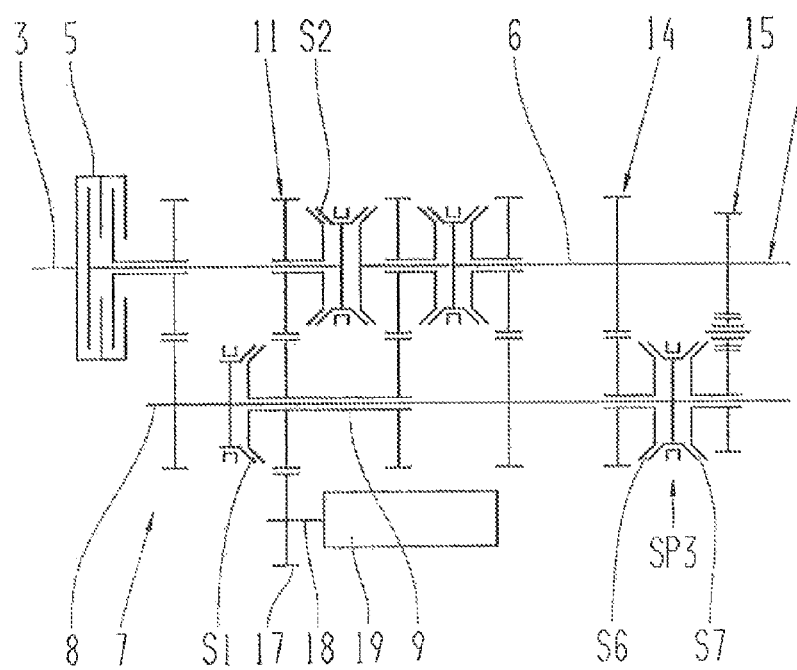
FIG. 2: A schematic representation of a second preferred embodiment of a motor vehicle transmission according to the invention.

FIG. 2 shows a second preferred embodiment of a motor vehicle transmission according to the invention. The difference from the variant described above is that the fixed wheels of the fifth spur gear stage 14 and the reverse gear 15 are in this case located on the output shaft 6, so that loose wheels of the fifth spur gear stage 14 and the reversing gear 15 are mounted to rotate on the solid shaft 8 of the countershaft assembly 7 and can each be connected rotationally fixed to the solid shaft 8 by means of the third shifting packet SP3 also provided there. In this case the third shifting packet SP3 again consists of the sixth shifting element S6 and the seventh shifting element 57. A further difference is that the gearwheel 17 of the shaft 18 connected to the electric machine 19 meshes with the fixed wheel of the second spur gear stage 11 arranged on the hollow shaft 9. In this case also, the electric machine 19 can charge an accumulator while the vehicle is at rest or drive the vehicle purely electrically, since in one case the electric machine can be decoupled from the dual clutch 5 and hence also from the drive input 3 by means of the second shifting element S2, and in the other case it can be decoupled by means of the first shifting element S1 from the solid shaft 8 and hence, farther on, from the drive output 4.

Figure 3:
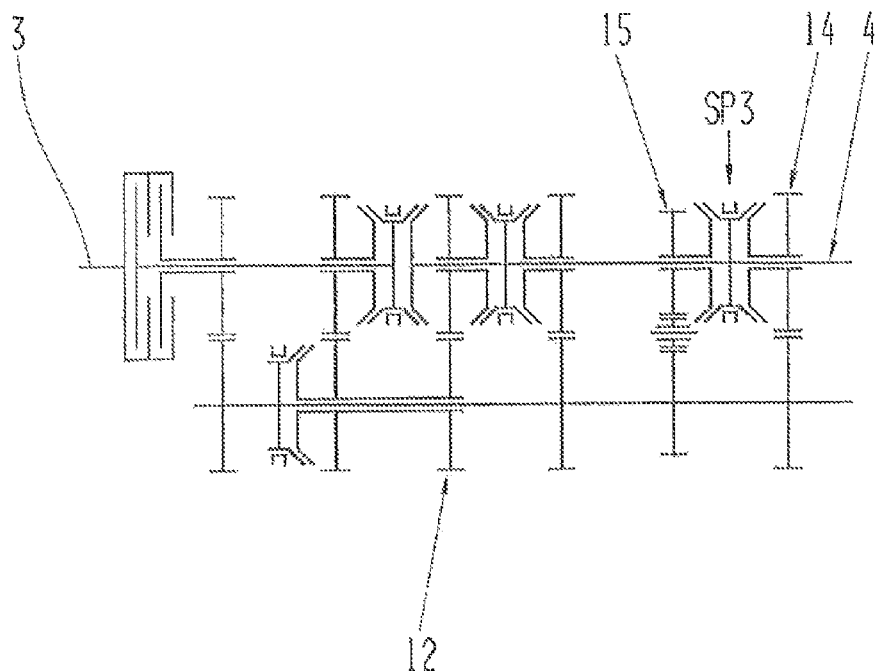
FIG. 3: A schematic view of a motor vehicle transmission according to the invention according to a third preferred embodiment of the invention.

Furthermore, FIG. 3 shows a third preferred design of a motor vehicle transmission according to the invention. In this case the difference from the variant shown in FIG. 1 is that the respective positions of the fifth spur gear stage 14 and the reverse gear 15 relative to the third shifting packet SP3 are exchanged. Thus, the reversing gear 15 is positioned on a side of the third shifting packet SP3 facing toward the drive input 3 and the fifth spur gear stage 14 is positioned on a side of the third shifting packet SP3 facing toward the drive output 4.

Moreover, in this case no electric machine is provided in the area of the third spur gear stage 12.

Figure 4:
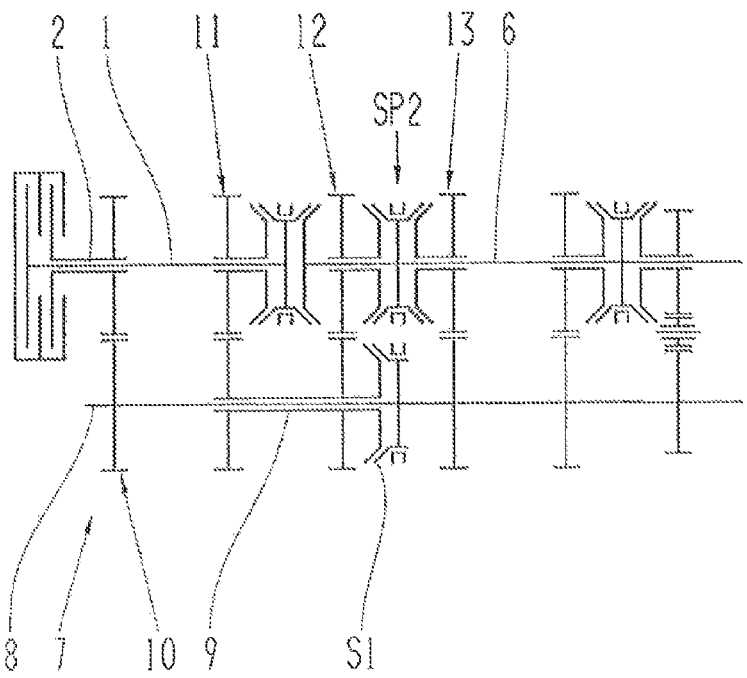
FIG. 4: A schematic representation of a fourth preferred embodiment of a motor vehicle transmission according to the invention.

FIG. 4 shows a further, fourth preferred embodiment of a motor vehicle transmission according to the invention, this version differing from the variant in FIG. 1 in that the first shifting element S1 is not positioned on the input side of the hollow shaft 9 between the first spur gear stage 10 and the second spur gear stage 11, but on the output side of the hollow shaft 9 and between the third spur gear stage 12 and the fourth spur gear stage 13, so that the first shifting element S1 is axially at the level of the second shifting packet SP2. In this case, however, between the countershaft assembly 7 and output shaft 6 and the central transmission shaft 1 and the hollow transmission shaft 2, sufficient fitting space must be available in the radial direction to accommodate the first shifting element S1 and the second shifting packet SP2 and its actuators.

Figures 5, 6:
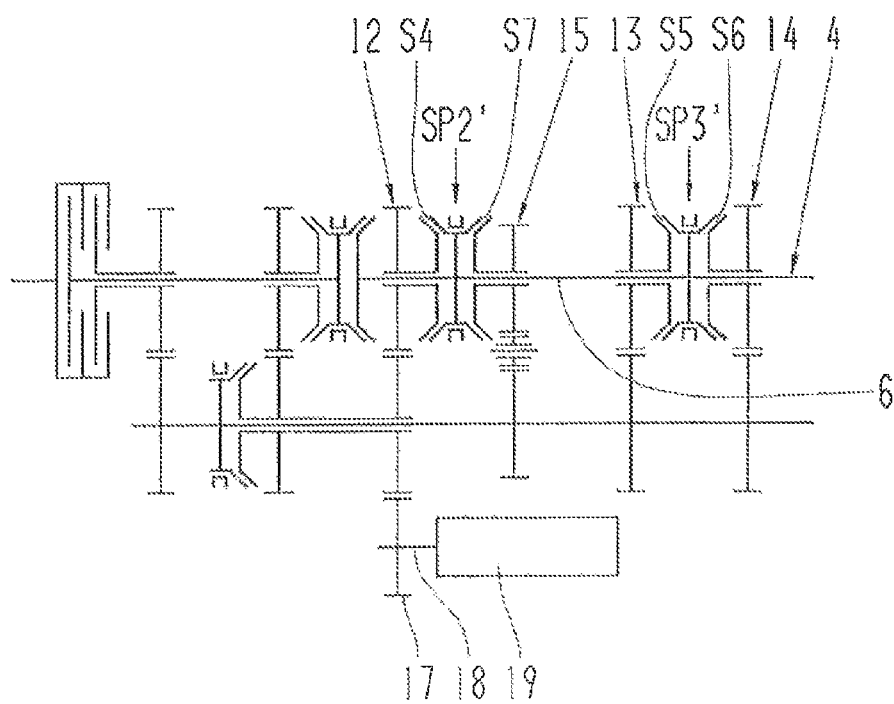
FIG. 5: An example of a shifting scheme of a motor vehicle transmission according to the invention according to FIGS. 1 to 4.
FIG. 6: A schematic representation of a motor vehicle transmission according to the invention, according to a fifth preferred embodiment of the invention.

FIG. 5 now shows an example shifting scheme that can be realized by any of the transmission variants shown in FIGS. 1 to 4. In total, six forward gears and two reversing gears can be obtained. For this, each gear is obtained by actuating one or more of the shifting elements S1 to S7 and by connecting the central transmission shaft 1 to the drive input 3 by means of the powershift element K1 or connecting the hollow transmission shaft 2 thereto by means of the powershift element K2. In Gears 1 to 4 the force flow is directed via the countershaft assembly 7 and via in each case two of the spur gear stages 10 to 12 and 14, so that rotational movement of the drive input 3, after gearing down to a slow range, is transmitted to the output shaft 6 and hence to the drive output 4. In contrast, in the fifth gear rotational movement of the drive input 3 is transmitted to the output shaft 6 by a fixed connection and therefore directly. In the case of the sixth gear the rotation movement of the drive input 3 is geared up to a fast range, so that an overdrive gear of the motor vehicle transmission is produced.

The powershifting ability of the six forward gears and the two reverse gears is achieved, in a manner known to those familiar with the field, in that when driving in one gear and directing the force flow passing through one of the two partial transmissions into the respective other partial transmission, the shifting elements S1 to S7 involved in obtaining a subsequent gear are already preselected and for the final shift only the powershift element K1 or K2 of one of the partial transmissions is opened and immediately thereafter the powershift element K2 or K1 of the other partial transmission is closed. Thus, driving virtually free from traction force interruption is made possible.

In the present case the first forward gear is obtained by closing the powershift element K1 and so connecting the central transmission shaft 1 to the drive input 3, and actuating the first shifting element S1, the second shifting element S2 and the sixth shifting element S6. To shift to the second forward gear the two shifting elements S1 and S2 are disengaged again whereas, prior to the ultimate shift, the powershift element K1 has to be opened and the powershift element K2 closed. For the next, third forward gear the change-over between the powershift elements K1 and K2 is repeated and, before that, the second shifting element S2 and the fourth shifting element S4 are actuated and once the shift has taken place the sixth shifting element S6 has to be disengaged. The fourth forward gear is obtained by actuating the first shifting element S1 and the fourth shifting element S4, and if starting from the third forward gear the powershift element K2 has to be closed and the powershift element K1 opened. In the fifth forward gear the central transmission shaft 1 is connected directly by the third shifting element S3 to the output shaft 6, and to carry out this shift the powershift element K2 has to be opened and the powershift element K1 closed. A further upshift gives the sixth forward gear by actuating the fifth shifting element S5 and thereafter opening the powershift element K1 and actuating the powershift element K2. The first reversing gear, in contrast, is obtained by actuating the first shifting element S1, the second shifting element S2 and the seventh shifting element S7, and connecting the central transmission shaft 1 to the drive input 3 by way of the powershift element K1. To shift to the next, second reversing gear, the powershift element K1 then has to be opened and the powershift element K2 closed, after which the first shifting element S1 and the second shifting element S2 have to be changed to a non-actuated condition.

As regards the arrangement of the third shifting packet SP3, the fifth spur gear stage 14 and the reversing gear 15, the first shifting element S1 and the provision and arrangement of an electric machine 19, the above-described variants of a motor vehicle transmission according to FIGS. 1 to 4 can be combined with one another in any desired manner. This then gives further variants of a motor vehicle transmission according to the invention.

Furthermore, FIG. 6 shows a fifth preferred design of a motor vehicle transmission according to the invention. The difference from the design according to FIG. 1 is that the reversing gear 15 is provided axially adjacent to and on the drive output side of the third spur gear stage 12, so that in this case the fourth shifting element S4 and the seventh shifting element S7 are combined in a second shifting packet SP2'. Correspondingly, the fourth spur gear stage 13, previously located at the present position of the reversing gear 15, is displaced axially farther toward the drive output 4 and positioned close to the fifth spur gear stage 14. The fifth shifting element S5 of the fourth spur gear stage 13 and the sixth shifting element S6 of the fifth spur gear stage 14 are in this case combined in a third shifting packet SP3', which is arranged on the output shaft 6 and is designed as a dual synchronizer. As regards other design features, the variant of a motor vehicle transmission according to the invention shown in FIG. 6 otherwise corresponds to that described with reference to FIG. 1.

Figure 7:
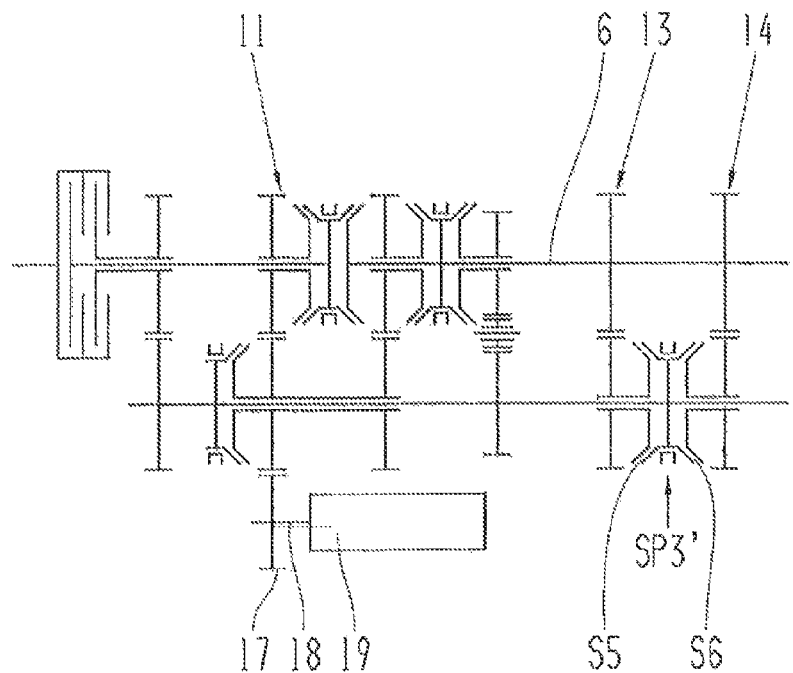
FIG. 7: A schematic view of a motor vehicle transmission according to the invention, according to a sixth preferred design of the invention.

A sixth preferred design of a motor vehicle transmission according to the invention is represented schematically in FIG. 7. This design differs from the variant in FIG. 6 in that fixed wheels of the fourth spur gear stage 13 and of the fifth spur gear stage 14 are in each case arranged on the output shaft 6, so that the loose wheels which respectively mesh with them are located on the solid shaft 8 of the countershaft assembly 7. Correspondingly, the third shifting packet SP3' is also mounted on the solid shaft 8. This has the advantage of reducing the shifting forces that have to be applied for shifting processes of the fifth shifting element S5 or the sixth shifting element S6. In addition, the loose wheels of the fourth spur gear stage 13 and the fifth spur gear stage 14 do not rotate when the vehicle is stationary, but together with the output shaft 6 they are at rest so they do not contribute to producing noise. A further difference is that the gearwheel 17 of the shaft 18 connected to the electric machine 19 meshes with the fixed wheel of the second spur gear stage 11, as it does in the variant according to FIG. 2.

Figure 8:
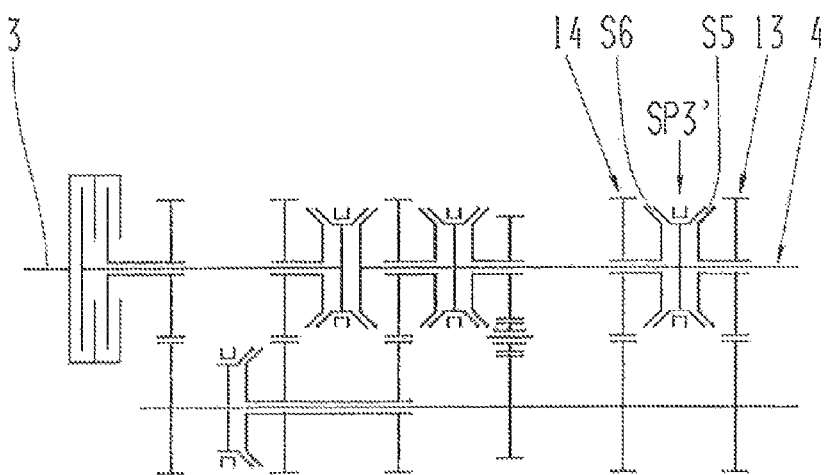
FIG. 8: A schematic representation of a seventh preferred embodiment of a motor vehicle transmission according to the invention.

A further, seventh preferred embodiment of a motor vehicle transmission is shown in FIG. 8. This differs from the variant in FIG. 6 in that the fourth spur gear stage 13 and the fifth spur gear stage 11 are mirror-reversed in their arrangement relative to the third shifting packet SP3'. Thus, the fourth spur gear stage 13 is located on the drive output side 4 and the fifth spur gear stage 11 on the drive input side 3 of the third shifting packet SP3'. In addition, in the design according to FIG. 8 no electric machine is provided in the area of the spur gear stage 12.

Figures 9, 10:
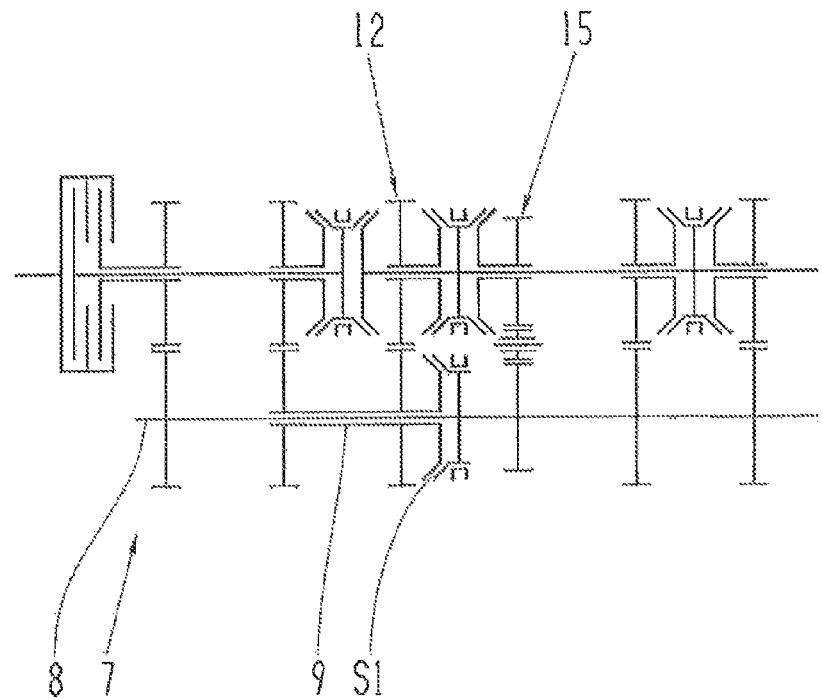
FIG. 9: A schematic view of a motor vehicle transmission according to the invention, which corresponds to an eighth preferred design on the invention.
FIG. 10: An example of a shifting scheme of a motor vehicle transmission according to FIGS. 6 to 9.

Finally, FIG. 9 shows an eighth preferred embodiment of a motor vehicle transmission according to the invention, which differs from that shown if FIG. 6 in that the first shifting element S1, by which the hollow shaft 9 of the countershaft assembly 7 can be coupled to the solid shaft 8, is positioned on the drive output side of the hollow shaft 9 between the third spur gear stage 12 and the reversing gear 15. Moreover, there is again no electric machine in the area of the spur gear stage 12.

With the individual variants shown in FIGS. 6 to 9, a total of six powershifting forward gears and two powershifting reversing gears can be obtained, for which, corresponding to the actuation of the individual shifting elements S1 to S7, four example shifting schemes shown in FIGS. 10 to 13 are possible. In these, again in the first four forward gears rotational movement of the drive input 3 is transmitted with gear ratios in the slow range to the output shaft 6 and thence to the drive output 4, while the fifth forward gear is a fixed, direct drive from the drive input 3 to the drive output 4. In contrast, in the sixth forward gear rotational movement of the drive input 3 is transmitted to the drive output with a fast gear ratio, so that an overdrive gear of the motor vehicle transmission according to the invention is produced. The power-shifting ability of the forward gears and the reversing gears is enabled, in a manner known to those familiar with the field, by alternate coupling of the central transmission shaft 1 to the drive input by means of the power-shifting element K1 and of the hollow transmission shaft 2 thereto by means of the power-shifting element K2, along with corresponding pre-selection of the respective subsequent gear by actuating the appropriate shifting elements S1 to S7.

FIG. 10 now shows a first example shifting scheme for obtaining the individual gears of the transmission variants according to FIGS. 6 to 9. As can be seen, the first forward gear is obtained by connecting the central transmission shaft 1 to the drive input 3 by means of the power-shifting element K1 and actuating the first shifting element S1, the second shifting element S2 and the fifth shifting element S5. To shift to the second forward gear the power-shifting element K1 has to be opened and the power-shifting element K2 closed, and thereafter the first shifting element S1 and the second shifting element S2 have to be changed to an inactive condition. For a further upshift to the third forward gear the second shifting element S2 and the fourth shifting element S4 have to be actuated and then the hollow transmission shaft 2 has to be disconnected from the drive input 3 and the central transmission shaft 1 connected thereto by means of the power-shifting element K1. The next, fourth forward gear is obtained by closing the power-shifting element K2 having previously actuated the sixth shifting element S6. To engage the fifth forward gear, the central transmission shaft 1 is first coupled in a fixed manner to the output shaft 6 by means of the third shifting element S3 and the central transmission shaft 1 is then connected to the drive input 3 by means of the power-shifting element K1 after opening the power-shifting element K2. Finally, the sixth forward gear is obtained by actuating the first shifting element S1 and the fourth shifting element S4, and coupling the hollow transmission shaft 2 to the drive output 3 by means of the power-shifting element K2. The first reversing gear is obtained by actuating the first shifting element S1, the second shifting element S2 and the seventh shifting element S7, and in addition connecting the central transmission shaft 1 to the drive output by means of the power-shifting element K1. A change to the second reversing gear is carried out by opening the power-shifting element K1 again and closing the power-shifting element K2, so that the latter connects the hollow transmission shaft 2 to the drive output 3.

A further example shifting scheme of the individual designs shown in FIGS. 6 to 9 can be seen in FIG. 11. The difference from the variant in FIG. 10 is that the fourth forward gear is obtained by closing the power-shifting element K2 and actuating the sixth shifting element S6. Furthermore, the sixth forward gear is obtained by closing the power-shifting element K2 and actuating the first shifting element S1 and the fourth shifting element S4. The other gears, in contrast, are obtained analogously to the shifting scheme in FIG. 10.

In addition, FIG. 12 shows another possible shifting scheme for the transmission variants according to FIGS. 6 to 9. Otherwise than in the shifting scheme shown in FIG. 10 and the description relating thereto, the first forward gear is obtained by closing the power-shifting element K1 and actuating the first shifting element S1, the second shifting element S2 and the sixth shifting element S6. Furthermore, the second forward gear is obtained by actuating the sixth shifting element S6 in combination with engaging the power-shifting element K2. Moreover, to engage the fourth forward gear, the fifth shifting element S5 has to be actuated and the power-shifting element K2 closed. The other gears, however, then again correspond to the shifting scheme shown in FIG. 10.

Finally, FIG. 13 shows still another variant of a possible shifting scheme for the embodiments of a motor vehicle transmission corresponding to FIGS. 6 to 9. Similarly to the previous variant according to FIG. 12 and otherwise than in the shifting scheme of FIG. 10, in each case the sixth shifting element S6 instead of the fifth shifting element S5 is involved in obtaining the first and second forward gears. Furthermore, the fourth forward gear is obtained by actuating the first shifting element S1 and the fourth shifting element S4 and by closing the power-shifting element K2. As regards the sixth forward gear, the fifth shifting element S5 then has to be actuated and the power-shifting element K2 closed. The other gears again correspond to the transmission scheme of FIG. 10.

As regards the arrangement of the third shifting packet SP3', that of the fourth spur gear stage 13 and that of the fifth spur gear stage 14, the first shifting element S1 and the provision and positioning of an electric machine 19, the above-described variants of a motor vehicle transmission according to FIGS. 6 to 9 can be combined with one another as desired. This then provides further transmission variants.

Besides the synchronization means in the form of shifting elements S1 to S7 used in the individual transmission variants according to FIGS. 1 to 4 and 6 to 9, in the context of the invention some other design such as interlocking clutches, for example claw clutches, is in principle also conceivable. Moreover, the shifting elements S1 to S7 can also be designed as frictional clutches, preferably disk clutches. Furthermore it is consistent with the invention, besides the various positions shown in the figures for arranging an electric machine 19, also to consider providing a plurality of electric machines and arranging these as necessary on one or more shafts, on a fixed wheel of the spur gear stages 10 to 15, on a loose wheel of the spur gear stages 10 to 15 or on a fixed wheel provided additionally, similarly to the gearwheel 17.

Besides, the dual clutch 5 consisting of the two power-shifting elements K1 and K2 can also be replaced by an electric machine which is solely responsible for providing appropriate support during the shifts or which, in combination with the drive aggregate and an additional planetary gear system, reproduces the characteristics of a dual clutch 5. If necessary, with these two variants an additional dual shifting element has to be provided, by means of which one can shift between the two variants.

By virtue of the individual designs of a motor vehicle transmission according to the invention, it is therefore possible to obtain a large number of gears using fewer spur gear stages and fewer shifting elements. Moreover, the motor vehicle transmission according to the invention can be hybridized without difficulty.

INDEXES

1 Central transmission shaft
2 Hollow transmission shaft
3 Drive input
4 Drive output
5 Dual clutch
6 Output shaft
7 Countershaft assembly
8 Solid shaft
9 Hollow shaft
10 First spur gear stage
11 Second spur gear stage
12 Third spur gear stage
13 Fourth spur gear stage
14 Fifth spur gear stage
15 Reversing gear
16 Intermediate shaft
17 Gearwheel
18 Shaft
19 Electric machine
K1 Power-shifting element
K2 Power-shifting element
S1 First shifting element
S2 Second shifting element
S3 Third shifting element
S4 Fourth shifting element
S5 Fifth shifting element
S6 Sixth shifting element
S7 Seventh shifting element
SP1 First shifting packet
SP2 Second shifting packet
SP3 Third shifting packet
SP2' Second shifting packet
SP3' Third shifting packet

The invention claimed is:
1. A motor vehicle transmission comprising:
first and second partial transmissions, and each partial transmission having an input shaft arranged coaxially with one another,
each of the input shafts being alternately connectable to a drive input (3) and, in a flow of force, to a drive output (4),
the input shaft of the first partial transmission is a central transmission shaft (1) and the input shaft of the second partial transmission is a hollow transmission shaft (2),
the drive output (4) of both the first and the second partial transmissions being an output shaft (6) positioned coaxially with both of the input shafts,
a countershaft assembly (7) being arranged parallel to the input shafts and the output shaft (6),
rotational movement being transmittable from the drive input (3) to the drive output (4) via one of several discrete gear ratios,
each of the gear ratios being obtained by directing the flow of force, via the countershaft assembly (7), by at least two spur gear stages (10 to 15) and by actuating at least one associated shifting element (S1, S2, S4 to S7), and changing between the first and the second partial transmissions such that gearshifts being powershifts, the hollow transmission shaft (2) of the second partial transmission being connected to a solid shaft (8) of the countershaft assembly (7) by a first spur gear stage (10) on which a coaxial hollow shaft (9) being additionally mounted, the hollow shaft (9) being connectable, in a rotationally fixed manner, by a first shifting element (S1) to the solid shaft (8), and the hollow shaft (9) being connectable, via a second spur gear stage (11) and by actuating a second shifting element (S2), to the input shaft (1) of the first partial transmission, the input shaft of the first partial transmission being directly connectable, by only a third shifting element (S3), with the output shaft (6), and further spur gear stages (12 to 15) being provided between either the solid shaft (8) or the hollow shaft (9) and the output shaft (6).

2. The motor vehicle transmission according to claim 1, wherein the second and the third shifting elements (S2, S3) are combined with one another in a first shifting packet (SP1) which is arranged on the input shaft (1) of the first partial transmission, the hollow shaft (9) of the countershaft assembly (7) is couplable, by actuating a fourth shifting element (S4), to the output shaft (6) via a third spur gear stage (12), and the solid shaft (8) of the countershaft assembly (7) is connectable to the output shaft (6), by actuating a fifth shifting element (S5), via a fourth spur gear stage (13), the solid shaft (8) of the countershaft assembly (7) is connectable to the output shaft (6), by actuating a sixth shifting element (S6), via a fifth spur gear stage (14), and the solid shaft (8) of the countershaft assembly (7) is connectable to the output shaft (6), by actuating a seventh shifting element (S7), via a reverse gear (15).

3. The motor vehicle transmission according to claim 2, wherein the fourth shifting element (S4) and the fifth shifting element (S5) are combined with one another in a second shifting packet (SP2), and the sixth shifting element (S6) and the seventh shifting element (S7) are combined with one another in a third shifting packet (SP3).

4. The motor vehicle transmission according to claim 3, wherein the fifth spur gear stage (14) is positioned on a drive input side of the third shifting packet (SP3) and the reversing gear (15) is positioned on a drive output side of the third shifting packet (SP3).

5. The motor vehicle transmission according to claim 3, wherein the fifth spur gear stage (14) is positioned on a drive output side of the third shifting packet (SP3) and the reversing gear (15) is positioned on a drive input side of the third shifting packet (SP3).

6. The motor vehicle transmission according to claim 2, wherein the fourth shifting element (S4) and the seventh shifting element (S7) are combined with one another in a second shifting packet (SP2') and the fifth shifting element (S5) and the sixth shifting element (S6) are combined with one another in a third shifting packet (SP3').

7. The motor vehicle transmission according to claim 6, wherein the fourth spur gear stage (13) is positioned on the drive input side of the third shifting packet (SP3'), and the fifth spur gear stage (14) on the drive output side thereof.

8. The motor vehicle transmission according to claim 6, wherein the fourth spur gear stage (13) is positioned on a drive output side of the third shifting packet (SP3'), and the fifth spur gear stage (14) is positioned on a drive input side of the third shifting packet (SP3').

9. The motor vehicle transmission according to claim 3, wherein the second shifting packet (SP2; SP2') and the third shifting packet (SP3; SP3') are each arranged on the output shaft (6).

10. The motor vehicle transmission according to claim 3, wherein the second shifting packet (SP2; SP2') is located on the output shaft (6), and the third shifting packet (SP3; SP3') is arranged on the solid shaft (8) of the countershaft assembly (7).

11. The motor vehicle transmission according to claim 1, wherein the first shifting element (S1) is arranged on a drive input side of the hollow shaft (9) of the countershaft assembly (7).

12. The motor vehicle transmission according to claim 1, wherein the first shifting element (S1) is arranged on a drive output side of the hollow shaft (9) of the countershaft assembly (7).

13. The motor vehicle transmission according to claim 1, wherein a gearwheel of either the second or the third spur gear stage (11, 12) meshes with a gearwheel (17) of a shaft (18) which is connected with an electric machine (19).

14. A motor vehicle transmission comprising:

first and second partial transmissions each having an input shaft, the input shaft of the second partial transmission being a hollow transmission shaft (2), the input shaft of the first partial transmission being a central transmission shaft (1) and coaxially extending through the input shaft of the second partial transmission, and the input shafts of the first and the second partial transmissions being alternately connectable to a drive input (3) to transmit drive to a drive output (4);

the drive output (4) of the first and the second partial transmissions is an output shaft (6) being coaxially aligned with the input shafts of the first and the second partial transmissions;

a countershaft assembly (7) comprising a hollow shaft (9) and a solid shaft (8) coaxially supported within the hollow shaft (9) of the countershaft assembly (7), the solid and the hollow shafts (8, 9) of the countershaft assembly (7) being arranged parallel to the input shafts of the first and the second partial transmissions and the output shaft (6);

at least first and second spur gear stages (10-15) and at least first, second, and third shifting elements (S1-S7) being selectively engageable to implement a plurality of discrete gear ratios and transmit drive from the drive input (3) to the drive output (4), each of the plurality of discrete gear ratios being implemented by directing drive, by at least the first and the second spur gear stages (10-15), via the countershaft assembly (7), and by actuating at least one of the first, the second, and the third shifting elements (S1-S7), and by alternately engaging the first and the second partial transmissions:

the input shaft of the second partial transmission being connected, via the first spur gear stage (10), to the solid shaft (8) of the countershaft assembly (7), and the solid shaft (8) of the countershaft assembly (7) being connectable in a rotationally fixed manner, via the first shifting element (S1), to the hollow shaft (9) of the countershaft assembly (7) and the second spur gear stage (11);

the hollow shaft (9) of the countershaft assembly (7) being connectable, via the second shifting element (S2), to the input shaft of the first partial transmission, and the input shaft of the first partial transmission being connectable, via engagement of only the third shifting element (S3), to the output shaft (6); and additional spur gear stages (12-15) being located between a drive flow of either the solid shaft (8) of the countershaft assembly (7) or the hollow shaft (9) of the countershaft assembly (7) and the output shaft (6).

* * * * *